(12) United States Patent
Boll

(10) Patent No.: US 9,243,646 B2
(45) Date of Patent: Jan. 26, 2016

(54) IMPELLER

(71) Applicant: Grundfos Holding a/s, Bjerringbro (DK)

(72) Inventor: Jens Vestergaard Boll, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 504 days.

(21) Appl. No.: 13/723,678

(22) Filed: Dec. 21, 2012

(65) Prior Publication Data

US 2013/0164136 A1 Jun. 27, 2013

(30) Foreign Application Priority Data

Dec. 21, 2011 (EP) ..................... 11194884

(51) Int. Cl.
*F04D 29/22* (2006.01)
*F04D 29/62* (2006.01)
*B29C 65/16* (2006.01)

(52) U.S. Cl.
CPC .......... *F04D 29/2222* (2013.01); *F04D 29/628* (2013.01); *B29C 65/1635* (2013.01)

(58) Field of Classification Search
CPC ............ F04D 29/2222; F04D 29/2227; F04D 29/2216; F04D 29/24; F04D 29/628; F04D 29/662; F04D 29/666
See application file for complete search history.

(56) References Cited

U.S. PATENT DOCUMENTS 5,893,959 A * 4/1999 Muellich ..................... 156/272.8
8,007,240 B2 * 8/2011 Sanagi et al. ............. 416/186 R

FOREIGN PATENT DOCUMENTS

| DE | 4402493 A1 | 8/1995 |
| DE | 29904668 U1 | 6/1999 |
| EP | 0283825 A1 | 9/1988 |
| JP | 59-211795 A | 11/1984 |

OTHER PUBLICATIONS

Search Report issued Jun. 13, 2012 in EP Application No. 11194884.0.

* cited by examiner

*Primary Examiner* — Troy Chambers
*Assistant Examiner* — Joshua Semick
(74) *Attorney, Agent, or Firm* — Panitch Schwarze Belisario & Nadel LLP

(57) ABSTRACT

An impeller (2) for a centrifugal pump includes a first shroud having a plurality of blades (8). A second shroud is joined onto the first shroud by way of welding. Each blade (8) has an apex region (12), at which the blade contacts the second shroud. At least one of the blades (8) in a first section (20) of the apex region (12) has a weld connection to the second shroud, and in at least one second section (14) of the apex region (12) is free of a weld connection.

11 Claims, 4 Drawing Sheets

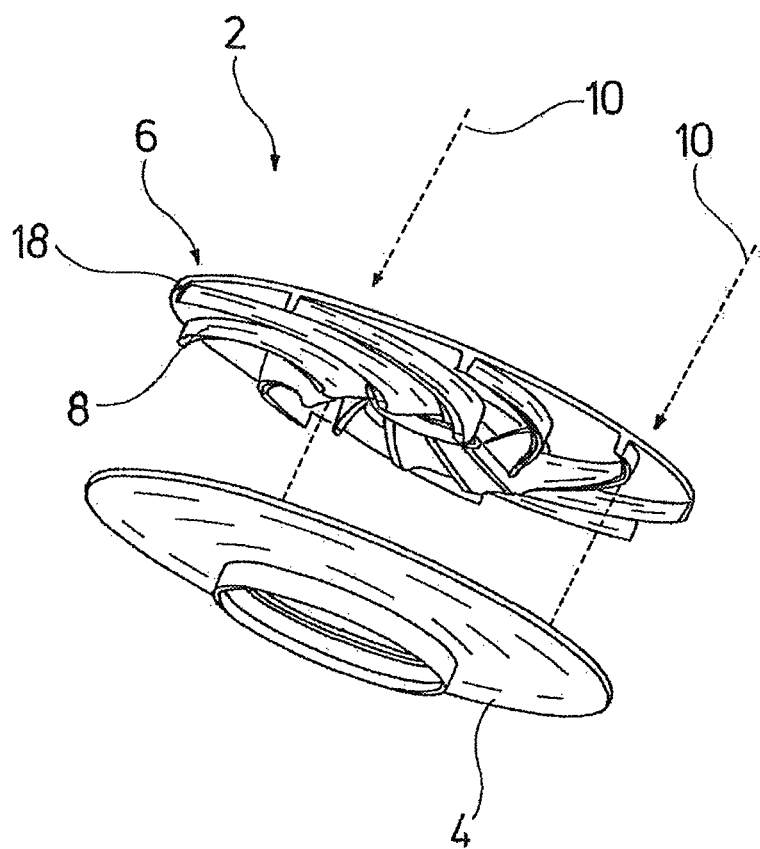

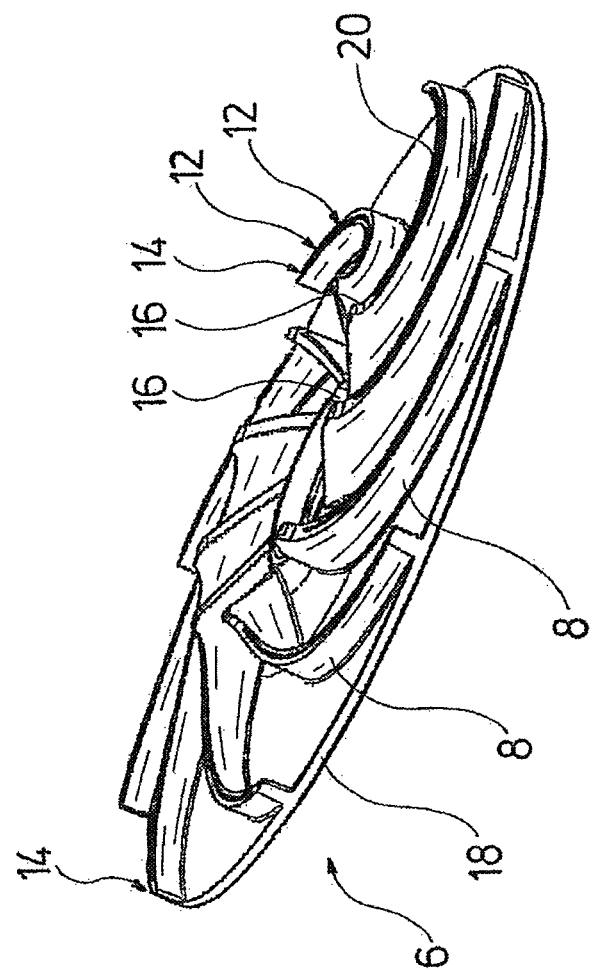

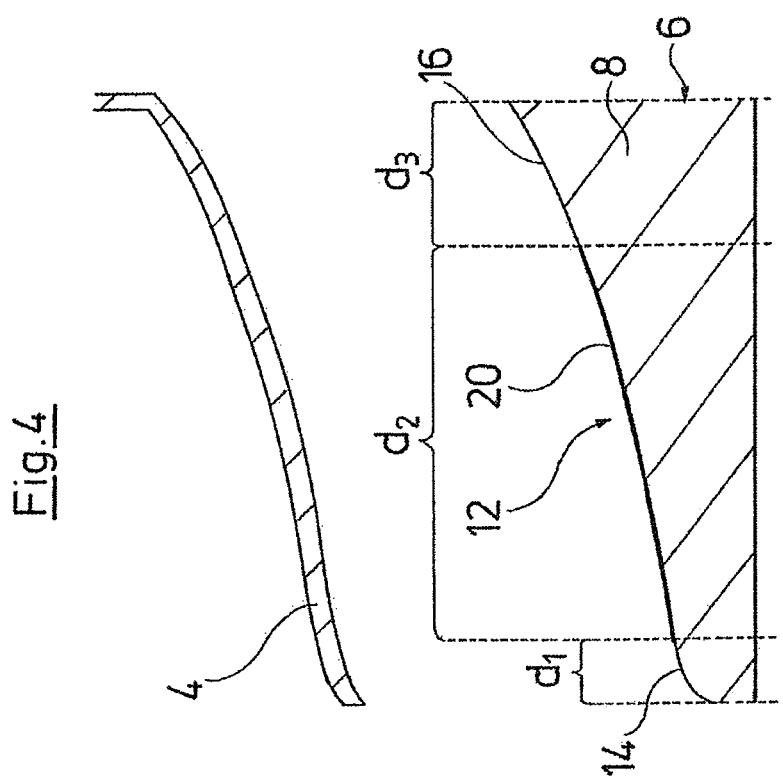

IMPELLER

BACKGROUND OF THE INVENTION

The present invention relates generally to an impeller for a centrifugal pump, as well as to a centrifugal pump with such an impeller.

Impellers are applied in numerous types of centrifugal pumps. Impellers often have an extremely complex geometry which renders it difficult to manufacture them by way of injection molding. For this reason, it is necessary in many cases to manufacture two separate parts and to then join these together.

With impellers of plastic which are manufactured, for example ,of fiber-reinforced plastic materials such as polymer composite materials or plastic composite materials, the parts of the impellers are connected, for example, by way of ultrasound welding. Ultrasound welding, however, often causes asymmetries in the impellers. One of the main disadvantages with the use of ultrasound welding is the fact that problems with regard to the eccentricity of the impellers can often occur with ultrasound-welded impellers.

Ultrasound welding is known in the state of the art for connecting complex plastic parts. These parts are usually inserted in a sandwich-like manner between a fixed part and a further part which is connected to a transducer, in order to couple in an acoustic vibration.

The ultrasound produces a connection when the contact points between the parts begin the melt. Ultrasound welding causes local melting of the plastic due to the absorption of the vibration energy and thus deformations can occur at locations, which causes the mentioned asymmetries of the impeller.

With some impellers of the state of the art, the parts are connected amid the use of mechanical connection methods and laser welding, so that the impeller does not become asymmetrical. Mechanical connections are realized by way of one of the impeller parts obtaining groove-like structures. Such impellers, however, can likewise turn out to be asymmetrical due to inaccuracies of the groove-like structures.

Accordingly, an increased leakage flow can occur between the suction side and the pump housing of the impeller and this leads to a reduced efficiency of the pump, in which the impeller is inserted.

BRIEF SUMMARY OF THE INVENTION

For the reason(s), it is an objective of a preferred embodiment of the present invention to provide an impeller or a centrifugal pump which at least partly avoids the above-described disadvantages. A further object of a preferred embodiment of the present invention is to provide an impeller which is designed to increase the efficiency of the pump when it is inserted into a pump.

These objectives are achieved by an impeller and a centrifugal pump according to the description provided herein. Advantageous further developments of a preferred embodiment of the present invention are specified in the subsequent description and the drawings.

Thus, an impeller for a centrifugal pump is provided and this impeller has a first shroud (cover plate) including a number of blades and with a second shroud which is joined onto the first shroud by way of welding, wherein each blade comprises an apex region, at which it contacts the second shroud. According to a preferred embodiment of the present invention, thereby at least one blade of the number of blades in a first section of the apex region is connected via a weld connection to the second shroud, and in at least one second section of the apex region is free of a weld connection.

With a preferred embodiment of the present invention, the apex region includes a third section which is free of a weld connection.

The first section of the apex region can advantageously extend over a length which is greater than a total length of the second and third section of the apex region.

Advantageously, the first section is arranged in the middle of the apex region, the second section on an outer edge region of the apex region and the third section on an inner edge region of the apex region, in each case with respect to the impeller diameter of the at least one blade.

The second section can extend over a length of the apex region which makes up 1% to 20% in particular 5% to 10% of the total length of the apex region.

The third section can extend over a length of the apex region which makes up 1% to 40% in particular 10% to 20% of the total length of the apex region.

One of the first and second shrouds can be manufactured of transparent material and the other of the first and second shrouds can be manufactured at least partly of a light-absorptive material.

As the case may be, only the first section of the apex region can be manufactured of light-absorptive material.

The light-absorptive material can be a plastic with pigments, and the transparent material can be the same plastic without pigments.

The first shroud can advantageously be designed in a groove-less manner.

It is particularly advantageous if the weld connection is created by way of laser welding.

A preferred embodiment of the present invention also encompasses a centrifugal pump with one or more of the previously described impellers.

By way of a preferred embodiment of the present invention, particularly advantageously one succeeds in the locations of the shrouds, at which they are welded, not deforming with the welding procedure. Moreover, an eccentricity of the two shrouds can be avoided, since due to the absence of grooves which are required in the state of the art, the shrouds can be moved radially against one another before the welding, so that they can be well adjusted to one another. This contributes to the suction side of the pump being particularly well sealed with respect to the pump housing in operation, which increases the efficiency of the pump manufactured according to the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2 is an exploded perspective representation of a further preferred embodiment of the present invention;

FIG. 3 is a perspective view of the rear shroud provided with blades according to the present invention; and FIG. 4 is a cross-section-like exploded representation of an impeller according to a preferred embodiment of the present invention.

DETAILED DESCRIPTION OF THE INVENTION

Figure 1:
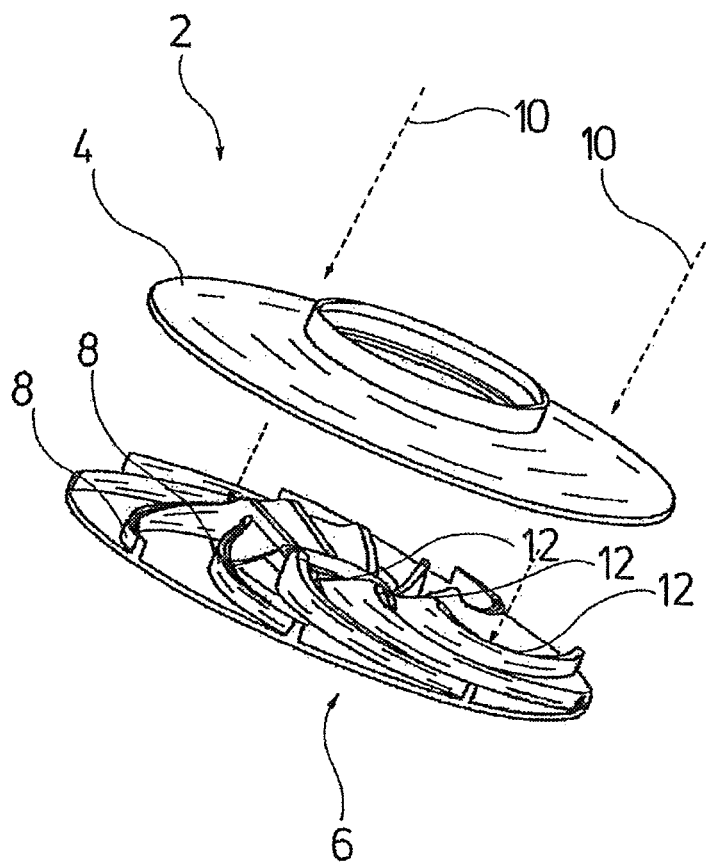
FIG. 1 is an exploded perspective representation of a first preferred embodiment of the present invention.

Certain terminology is used in the following description for convenience only and is not limiting. The words "front" and "rear" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, FIG. 1 illustrates an impeller 2 for a centrifugal pump having a first, rear shroud 6 which includes a number of blades 8, and second front shroud 4 which is joined to the rear shroud 6 or the blades 8 by way of welding. Each blade 8 preferably has an apex region 12, at which it contact the front shroud 4. At least one blade 8, in the present embodiment, however all blades 8, in a first section 20 of the apex region 12 have a weld connection to the front shroud 4, and in a second, outer section 14 and a third, inner section 16 of the apex region 12, it is free of a weld connection.

The front shroud 4 and the rear shroud 6 are distanced to one another by the blades 8. The front shroud 4 is manufactured of a material which is Tran missive to laser light 10, so that laser light 10 can enter through the front shroud 4, as is shown in FIG. 1. The rear shroud 6 preferably includes nine blades 8 which in each case are bent and extend from a central recess in the middle of the rear shroud 6 towards the edge 18 of the impeller 2. The rear shroud 6 is preferably manufactured of a material which is designed to be fastened onto the front side by way of laser welding, and specifically by way of laser light 10.

Basically, it is preferred that the same starting material can be used for the front shroud 4 and for the rear shroud 6. However, in order for the laser light 10 to be able to pass through one of the shrouds, either the front shroud 4 or the rear shroud 6 should be manufactured of a Tran missive material and the respective other shroud of a laser-light-absorptive material which melts under the influence of laser light 10. With the preferred embodiment example according to FIG. 1, the front shroud is of laser-light-Tran missive material and the rear shroud is of a material which can absorb laser light. As is evident from FIG. 1, laser light 10 which hits the front shroud 4 passes through this shroud 4 and is absorbed in the apex regions 12 of the blades 8 of the shroud 6.

The second rear shroud 6 can be manufactured of a plastic which is provided with pigments, so that it is laser-light-absorptive. The first, front shroud 4 can be manufactured of the same plastic but without pigments, so that it is laser-light-Tran missive.

With the preferred embodiment according to FIG. 2, the impeller 2 includes a front shroud 4 which is manufactured of a laser-light-absorptive material, and a rear shroud 6 of a laser-light-Tran missive material. The rear shroud 6 and the front shroud 4 are designed to be joined amid the application of the same method as has been described with reference to FIG. 1. Laser light 10 enters through the rear shroud 6 through the blades 8 and is absorbed in the front shroud 4.

Here, the first shroud 4 can be manufactured of a plastic which is provided with pigments, so that it is laser-light absorptive, whilst the second, rear shroud 6 can be manufactured of the same plastic but without pigments, so that it is Tran missive to laser light.

Preferably, polyether sulfide (PES) can be used as a material.

The plastic can be reinforced with 1% to 40% glass fibers, preferably with 10% to 30%.

The rear shroud 6 (after joining together with the front shroud 4) is described in more detail with reference to FIG. 3. The rear shroud 6 preferably includes nine blades 8 which are arranged at the same distance to one another along the periphery 18 of the rear shroud 6. Laser light 10 is to enter through the front shroud 4, as has been described with reference to FIG. 1 and is to be absorbed on the apex lines 12 of the blades 8 of the rear shroud 6. In FIG. 3, the first section 20 of the apex region 12 which has a weld connection to the front shroud 4, is drawn in a darker manner since it is melted due to the absorbed laser light, whilst the second, outer or third, inner section 14 or 16 of the apex region 12 which is free of a weld connection because it is not melted, is drawn in a lighter manner.

The melted material is thus drawn darker than the remaining material of the rear shroud 6. No laser light 10 has been absorbed in the respective inner section 16 or outer section 14 of the apex region 12 of the blades 8 of the rear shroud 6.

The front shroud 4 and the rear shroud 6 can be joined together amid the use of light of any suitable laser light source 10. Preferably, however, a scanning method is applied, with which the laser light is absorbed at different locations of the part absorbing light (e.g., shroud 6) as a function of time. In this manner, a structural deformation of the locations due to overheating can be prevented.

Generally, it is possible to use a front shroud 4 and a rear shroud 6 which are manufactured of a Tran missive material, with the exception of those regions of the shrouds 4, 6 which are designed to melt when the laser light 10 is absorbed. That region of the shrouds, which is designed in order to melt when laser light is absorbed, should accordingly be suitable for absorbing laser light.

The cross-sectional representation according to FIG. 4 shows one half of a front shroud of an impeller 2 and the blade 8 lying there below. Only the first, middle section 20 of the apex region 12 of the blade 8 of the shroud 6 is connected to the shroud 4 by way of welding. This welded section 20 is surrounded by a second, outer section 14 and a third, inner section 16 which both remain free of a weld connection. The front shroud 4 of the impeller 2 is distanced to the rear shroud 6 by way of the blades 8. The radial contour of the front shroud 4 corresponds to the contour of the blades 8. As is further to be recognized, the length $C_2$ of the welded section 20 is larger than the length $C_1$ of the outer section 14 and the length $C_3$ of the inner section 16. The deformation of the blade 8 or of the shroud 4 can be avoided by way of the outer section 14 and the inner section 16 of the apex region 12 being free of a weld connection, since the outer section 4 and the inner section 16 press against the front shroud 4 and the required distance between the front shroud 4 and the rear shroud 6 is maintained by way of this.

The second section 14 which lies at the outside can extend over the length of the apex region 12 which makes up 1% to 20%, in particular 5% to 10% of the total length of the apex region 12.

The third section 16 which lies at the inside, can extend over a length of the aped region which makes up 1% to 40% in particular 10% to 20% of the total length of the apex region.

The impeller is particularly applied as in a centrifugal pump.

The manufacturing method for the impeller 2 according to a preferred embodiment of the present invention includes a joining step for joining the first shroud 4 onto the second shroud 6, wherein at least one blade 8 of a number of blades is welded onto the second shroud 6 merely in a first section 20 of the apex region 12 in the joining step, and wherein at least one second section 14 of the apex region 12 is not welded onto the section shroud 6 by way of the joining step, thus remains without a weld connection.

When the laser light 10 has been absorbed by the absorptive material, the front shroud 4 and the rear shroud 6 are ready to be joined together, and specifically simply by way of bringing them into contact with one another. This step can be carried out by a special tool.

However, it is also possible to bring the front shroud 4 and the rear shroud 6 in particular also into contact with one another and only then to begin the laser welding. In this manner, a very precise joining of the front shroud 4 to the rear shroud 6 is achieved, so that the eccentricity of the impeller 2 and the local deformations of the welded parts can be minimized.

The first shroud 4 has no grooves, so that the shrouds 4, 6 can be moved to one another in the radial direction, before the laser welding is carried out. In this manner, the two shrouds 4, 6 can be adjusted in a precise manner, so that an eccentricity of the impeller 2 can be avoided.

It has been found to be particularly advantageous if the joining step is carried out by way of laser welding, and the first shroud 4 and the second shroud 6 are brought into contact with one another before the welding.

The laser welding can advantageously be carried out by way of a scanning method, with which the two shrouds 4, 6 are joined together by way of a sequence laser welding method amid the use of a scanning path, with which the emitted laser light 10 is directed along this path to different locations, and the laser light 10 repeatedly runs along the same scanning path.

The impellers described above are formed from two components, specifically the rear shroud 6 with the blades 8 integrally formed thereon as one piece, and the front shroud 4. These two components are usefully manufactured as plastic injection molded components, but can also be formed in a different manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An impeller (2) for a centrifugal pump, the impeller comprising:
    a first shroud having a plurality of blades (8); and
    a second shroud joined onto the first shroud by way of welding,
    wherein each blade (8) has an apex region (12) where the blade contacts the second shroud, and
    wherein at least one of the blades (8) in a first section (20) of the apex region (12) has a weld connection to the second shroud, and in at least one second section (14) of the apex region (12) is free of a weld connection, and only the first section (20) of the apex region (12) is manufactured of a light-absorptive material.

2. The impeller (2) according to claim 1, wherein the apex region (12) comprises a third section (16) which is free of a weld connection.

3. The impeller (2) according to claim 2, wherein the first section (20) of the apex region (12) extends over a length (d2) which is larger than a total length of the second section (14) and the third section (16) of the apex region (12).

4. The impeller (2) according to claim 2, wherein the first section (20) is arranged in a middle of the apex region (12), the second section (14) on an outer edge region of the apex region (12) and the third section (16) on an inner edge region of the apex region (12).

5. The impeller (2) according to claim 1, wherein the second section (14) extends over a length (d1) of the apex region (12) which makes up 5% to 10% of a total length of the apex region (12).

6. The impeller (2) according to claim 2, wherein the third section (16) extends over a length (d3) of the apex region (12) which makes up 10% to 20% of a total length of the apex region (12).

7. The impeller (2) according to claim 1, wherein one of the first and second shrouds is manufactured of a transparent material and the other of the first and second shrouds is manufactured at least partly of light-absorptive material.

8. The impeller (2) according to claim 1, wherein the light-absorptive material is a plastic with pigments.

9. The impeller (2) according to claim 1, wherein the first shroud is designed without grooves.

10. The impeller (2) according to claim 1, wherein the weld connection is created by way of laser welding.

11. A centrifugal pump with an impeller (2) according to claim 1.

* * * * *